United States Patent
Fees et al.

(10) Patent No.: US 12,466,539 B2
(45) Date of Patent: Nov. 11, 2025

(54) LEADING EDGE DEVICE FOR AN AERODYNAMIC COMPONENT AND METHOD FOR MANUFACTURING A LEADING-EDGE DEVICE FOR AN AERODYNAMIC COMPONENT

(71) Applicant: Airbus Operations GmbH, Hamburg (DE)

(72) Inventors: Martin Fees, Hamburg (DE); Christian Bast, Hamburg (DE); Robert Lange, Hamburg (DE); Lilian Joachim, Hamburg (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 0 days.

(21) Appl. No.: 18/895,084

(22) Filed: Sep. 24, 2024

(65) Prior Publication Data
US 2025/0100672 A1   Mar. 27, 2025

(30) Foreign Application Priority Data
Sep. 25, 2023   (EP) ...................................... 23199406

(51) Int. Cl.
*B64C 3/28* (2006.01)
(52) U.S. Cl.
CPC ...................... *B64C 3/28* (2013.01)
(58) Field of Classification Search
CPC .... B64C 9/22; B64C 9/24; B64C 9/26; B64C 3/28
See application file for complete search history.

(56) References Cited

FOREIGN PATENT DOCUMENTS

| CN | 114728690 A | 7/2022 | |
|---|---|---|---|
| EP | 0800474 B1 * | 1/2002 | ............... B64C 1/06 |
| EP | 3006189 A1 * | 4/2016 | ........... B29C 66/543 |
| EP | 3816039 A1 | 5/2021 | |
| EP | 3078587 B1 | 8/2021 | |
| WO | 2021/099109 A1 | 5/2021 | |

OTHER PUBLICATIONS

PE2E English Translation for EP-0800474-B1 (Year: 2002).*
Extended European Search Report for EP23199406.2 mailed Feb. 29, 2024, 9 pages.

* cited by examiner

*Primary Examiner* — Timothy D Collins
*Assistant Examiner* — Eric Acosta
(74) *Attorney, Agent, or Firm* — Nixon & Vanderhye P.C.

(57) ABSTRACT

A leading-edge device for an aerodynamic component is disclosed having a first skin element having an inner surface and an aerodynamic outer surface, and further includes a second skin element having an inner surface and an aerodynamic outer surface. The leading-edge device includes a first coupling element protruding from the inner surface of the first skin element and a second coupling element protruding from the inner surface of the second skin element. The first and second coupling elements are coupled to each other in a coupling region. The first skin element and the first coupling element are formed as a single-piece structure.

14 Claims, 3 Drawing Sheets

LEADING EDGE DEVICE FOR AN AERODYNAMIC COMPONENT AND METHOD FOR MANUFACTURING A LEADING-EDGE DEVICE FOR AN AERODYNAMIC COMPONENT

CROSS REFERENCE TO RELATED APPLICATION

This application claims priority to and incorporates by reference the entirety of European Application Number EP 23199406.2, filed Sep. 25, 2023.

FIELD OF THE INVENTION

The invention relates to flow influencing systems for aerodynamic structures. In particular, the invention relates to a leading-edge device for an aerodynamic component as well as to a method for manufacturing a leading-edge device for an aerodynamic component.

BACKGROUND

Leading edge devices such as slats mounted to a wing of an aircraft are commonly known. These slats are usually made of metal and include a plurality of elements which are connected to each other with fasteners. Rivets, bolts and screws are examples for fasteners that are used to attach the slat skin to the underlying stiffening structure. For example, the slat skin may be riveted to spanwise stiffening elements, such as stringers, as well as to chordwise stiffening elements, such as ribs. Furthermore, the slat skin includes several skin elements being attached to each other via rivet connections, for example. The usage of several fasteners that are used to attach the different components of the slat to each other results in a complex structure. Furthermore, these fasteners may produce imperfections on the outer skin of the slat due to bending radii occurring at the locations of the fasteners. Downstream of these imperfections on the outer surface, the airflow usually changes from laminar to turbulent. At least, an imperfection of the outer surface of the skin may facilitate the airflow changing from laminar to turbulent, which may result in adverse impacts on the air flow behavior in the slat region.

WO 2021/099109 A1 and CN 114728690 A describe a slat arrangement for a wing of an aircraft, the arrangement having a movable leading-edge slat and a connection section, wherein the leading-edge slat comprises a slat leading-edge and a slat trailing-edge, wherein the connection section comprises a receiving opening for receiving the slat trailing-edge, wherein the connection section comprises an overhang having a free end, wherein the slat trailing-edge is designed to be translated under the overhang, and wherein a trailing region of the slat is configured to be elastically deformed by the overhang when the slat trailing-edge is moved into the receiving opening.

SUMMARY

The present disclosure encompasses a device and a method according to the features of the independent claims, and further embodiments of the invention are evident from the dependent claims and from the following description.

In an exemplary embodiment, a leading-edge device for an aerodynamic component is provided. The leading-edge device comprises a first skin element having an inner surface and an aerodynamic outer surface. The leading-edge device further comprises a second skin element having an inner surface and an aerodynamic outer surface. The leading-edge device further comprises a first coupling element protruding from the inner surface of the first skin element and a second coupling element protruding from the inner surface of the second skin element. The first coupling element and the second coupling element are coupled to each other in a coupling region that is arranged between the inner surface of the first skin element and the inner surface of the second skin element. The first skin element and the first coupling element are formed as a single-piece structure. In a preferred embodiment, also the second skin element and the second coupling element are formed as a single-piece structure.

The inventive leading-edge device may be a slat component or a slat device for an aerodynamic structure, for example a wing of an aircraft. In particular, the leading-edge device may be a slat of an aircraft wing. With the inventive leading-edge device, it is possible to facilitate the manufacturing thereof due to a reduced number of fasteners required to assemble the different parts of the leading-edge device. It is also possible to improve the aerodynamic characteristics of the leading-edge device since the leading-edge device includes less imperfections and irregularities on its aerodynamic outer surface than conventional leading-edge devices or slat devices. This advantage can be achieved by reducing or eliminating the usage of fasteners or attachment elements which might at least partially be present on the outer skin surface of the leading-edge device. In particular, the first coupling element may be used to stiffen the first skin element of the leading-edge device and may be integrally formed with the first skin element such that the first coupling element and the first skin element are formed as a single-piece structure. In this manner, the usage of fasteners to attach the first coupling element to the inner surface of the first skin element can be avoided. In an example, the first coupling element and the first skin element are formed of the same material.

Fasteners or attachment elements are commonly used to attach the skin element of the leading-edge device to its inner stiffening elements. However, if such fasteners or attachment elements pass through the outer skin surface of the skin element of the leading-edge device, an imperfection on the outer surface of the skin element occurs which may have adverse impacts on the flow behavior over said outer surface. The inventive leading-edge device now also provides a possibility to keep the skin elements free of any imperfections. As a result, the natural laminar flow over the outer surfaces of the skin elements is promoted due to the reduction or full removal of imperfections on the outer skin. This means that a possible laminar to turbulent transition of the flow may be shifted further downstream which in turn leads to a drag reduction and/or improvements in the high-lift characteristics of the whole leading-edge device. The aerodynamic outer surfaces of the first and second skin elements may be the surfaces along which the air flow is present during operation of the leading-edge device.

The first skin element may be a rear (lower) skin element of the leading-edge device and the second skin element may be a front (upper) skin element of the leading-edge device. Both skin elements may be coupled to each other via the first and second coupling elements. In particular, the two coupling elements may extend within an inner space of the leading-edge device and are coupled to each other in order to connect the first skin element to the second skin element, thereby stiffening the overall structure of the leading-edge device.

The inventive leading-edge device avoids the presence or at least reduces the number of fasteners or attachment elements required to connect the different parts of the leading-edge device, thereby reducing complexity during manufacturing and maintenance of the leading-edge device.

The coupling elements are used to mechanically connect the first skin element to the second skin element. The coupling elements may be stiffening elements like stringers, ribs, or the like. The coupling elements may extend inside the leading-edge device such that the coupling elements are arranged in a space defined between the first skin element and the second skin element.

The first coupling element forms a single-piece structure together with the first skin element. The second coupling element may also form a single-piece structure together with the second skin element, but may alternatively be attached to the second skin element via fastening means, a bonding connection, etc.

The first coupling element may protrude into the space between the first and second skin elements. The second coupling element may also protrude into the space between the first and second skin elements. In the coupling region both coupling elements may be in contact with each other, thereby allowing a coupling mechanism with which the first coupling element is coupled to the second coupling element.

According to an exemplary embodiment, the second skin element and the second coupling element are formed as a single-piece structure.

In particular, the second coupling element that may be used to stiffen the second skin element of the leading-edge device may be integrally formed with the second skin element such that the second coupling element and the second skin element are formed as a single-piece structure. In this manner, the usage of fasteners to attach the second coupling element to the inner surface of the second skin element can be avoided. In an example, the second coupling element and the second skin element are formed of the same material.

According to an exemplary embodiment, the first coupling element and the second coupling element overlap each other in the coupling region, thereby forming an overlapping region.

This allows to connect the first and second coupling elements via a connecting or bonding surface that is provided by the overlapping part in which the first coupling element and the second coupling element are in contact with each other, e.g., lie against each other. In particular, the first and/or second coupling elements may have a plate-like structure with flat surfaces. These flat surfaces may abut against each other to allow the coupling of the two coupling elements.

According to an exemplary embodiment, the first coupling element and the second coupling element are bonded to each other via a bonding connection in the coupling region.

The bonding connection may be a welded bonding connection which for example is generated using laser beam welding and/or other inductive welding techniques. It is also possible to use an adhesive for bonding the two coupling elements with each other.

According to an exemplary embodiment, the bonding connection is at least one of a metal bonding connection, a thermoset bonding connection or a thermoplastic bonding connection.

During the manufacturing of the respective connections, the material may be at least partially heated or even melted, thereby promoting a material bond between the first and second coupling element in the coupling region.

According to an exemplary embodiment, the first coupling element and the second coupling element are attached to each other in the coupling region using at least one of an adhesive connection, a weld connection, a screw connection or a rivet connection.

This list of connection types is not exhaustive and other types of connections are possible. These connection types may also be used in addition to the above-described bonding connection.

According to an exemplary embodiment, the aerodynamic outer surface of the first skin element is an entirely closed surface and/or the aerodynamic outer surface of the second skin element is an entirely closed surface.

This means that no fasteners may be required to attach the different components or parts of the leading-edge device to each other. In this manner, the outer aerodynamic surfaces of the skin elements might not have any irregularities which positively affects the air flow along these surfaces. The provision of an entirely closed surface of the respective skin element may also be facilitated since the skin elements may be manufactured as a single-piece structure as described above.

The term "closed" in the present context may be understood in that the outer surface has no holes, cavities, or bores that extend into the skin element. In other words, a "closed" outer surface might have no imperfections or irregularities and may rather have a continuous surface with a continuous extension or continuous curvature.

According to an exemplary embodiment, the first skin element is an integrally formed curved structure and/or the second skin element is an integrally formed curved structure.

The first skin element and/or the second skin element, in their cross section, may comprise an aerodynamic shape, for example an airfoil-like shape or at least the shape of a part of an airfoil. In operation, a fluid flow, for example a gas or a liquid, may flow over the curved aerodynamic outer surface of the first skin element and/or the curved aerodynamic outer surface of the second skin element. In a preferred embodiment, the leading-edge device is a slat of an aircraft and an air flow will flow over the curved aerodynamic outer surfaces of the skin elements during operation of the leading-edge device.

According to an exemplary embodiment, the single-piece structure formed by the first skin element and the first coupling element includes at least one of a reinforced thermoplastic material, a thermoset material or a metallic material.

The first skin element and the first coupling element may thus be manufactured of the same material.

In an example, the single-piece structure formed by the second skin element and the second coupling element includes at least one of a reinforced thermoplastic material, a thermoset material or a metallic material. The second skin element and the second coupling element may thus also be manufactured of the same material.

According to an exemplary embodiment, the first coupling element is a longitudinal stiffening element extending on the inner surface of the first skin element and configured to stiffen at least a part of the first skin element. Additionally or alternatively, the second coupling element is a longitudinal stiffening element extending on the inner surface of the second skin element and configured to stiffen at least a part of the second skin element.

For example, the first coupling element may be a stringer, a spar or a rib arranged inside the leading-edge device, i.e., between the first skin element and the second skin element. Analogously, the second coupling element may be a stringer, a spar or a rib arranged inside the leading-edge device, i.e., between the first skin element and the second skin element. These elements may comprise a plate-like structure extending along the respective inner surfaces of the first and second skin elements.

According to an exemplary embodiment, the first skin element and the second skin element define an aerodynamic profile having a chordwise direction and a spanwise direction which is substantially perpendicular to the chordwise direction, wherein each of the first coupling element and the second coupling element extends in the spanwise direction.

Thus, the coupling region may also extend in the spanwise direction. For example, the coupling elements, when coupled to each other, may provide a spanwise stiffening element, e.g., a stringer, which extends over its length on the inner surfaces of the skin elements.

According to an exemplary embodiment, an aircraft comprising the leading-edge device as described herein is provided. The aircraft may be a transport or passenger aircraft.

According to an exemplary embodiment, a use of the leading-edge device described herein as a leading-edge slat of an aircraft wing is provided.

According to an exemplary embodiment, a method for manufacturing a leading-edge device for an aerodynamic component is provided. A step of the method comprises providing a first skin element with a first coupling element protruding from an inner surface of the first skin element, wherein the first skin element and the first coupling element are formed as a single-piece structure. A further step of the method comprises providing a second skin element with a second coupling element protruding from an inner surface of the second skin element. A further step of the method comprises arranging the first coupling element relative to the second coupling element such that the first coupling element and the second coupling element overlap each other in a coupling region that is arranged between the first skin element and the second skin element. A further step of the method comprises bonding the first coupling element to the second coupling element in the coupling region.

The steps of the inventive method may be performed in the indicated order. However, another order may be possible.

BRIEF DESCRIPTION OF THE DRAWINGS

For an understanding of embodiments of the disclosure, reference is now made to the following description taken in conjunction with the accompanying drawings, in which.

DETAILED DESCRIPTION

Figure 1:
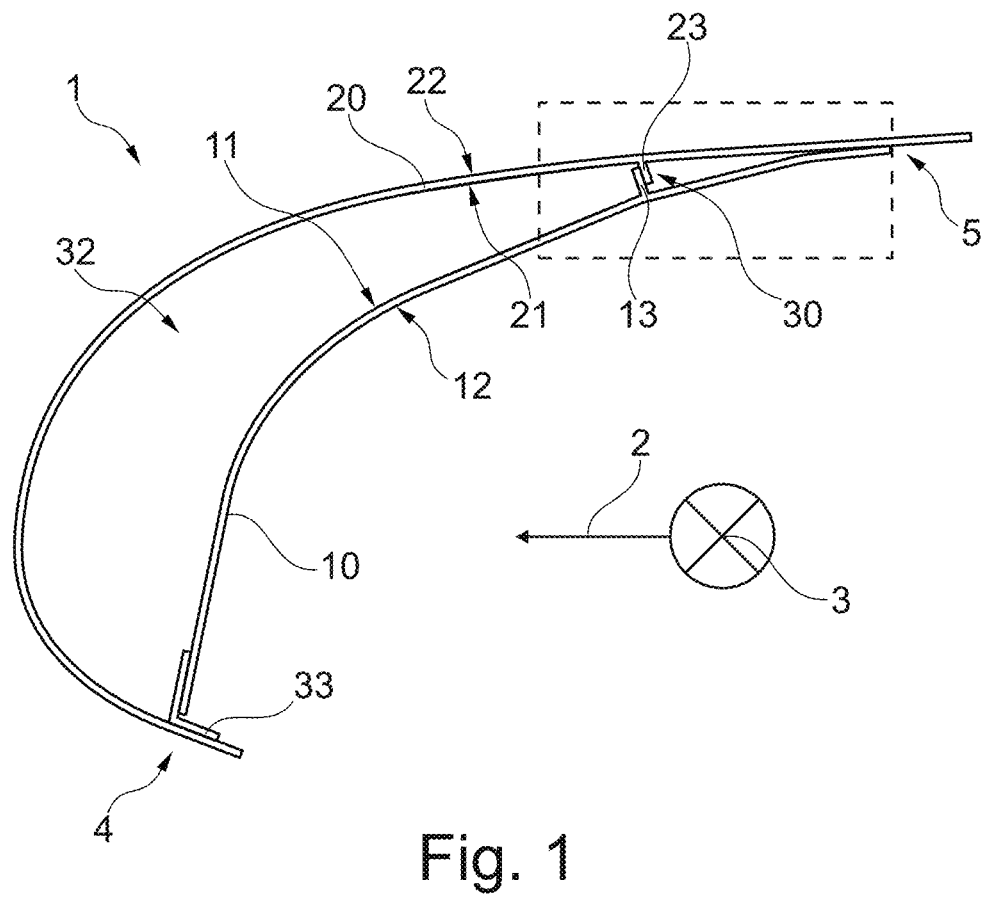
FIG. 1 illustrates a cross-sectional view of a leading-edge device.

Some embodiments will now be described with reference to the Figures. The representations and illustrations in the drawings are schematic and not to scale. A better understanding of the device and method described above may be obtained through a review of the illustrations accompanying this application together with a review of the detailed description that follows.

FIG. 1 shows a cross-sectional view of a leading-edge device 1. The leading-edge device 1 comprises a first skin element 10 having an inner surface 11 and an aerodynamic outer surface 12. The leading-edge device 1 also comprises a second skin element 20 having an inner surface 21 and an aerodynamic outer surface 22. The inner surfaces 11, 21 of the skin elements 10, 20 are arranged opposite to each other, i.e., the inner surfaces 11, 21 are facing each other, and define an inner space 32 of the leading-edge device 1.

The leading-edge device 1 further comprises a first coupling element 13 protruding from the inner surface 11 of the first skin element 10 and a second coupling element 23 protruding from the inner surface 21 of the second skin element 20. In other words, the first coupling element 13 protrudes away from the inner surface 11, for example such that the first coupling element 13 is arranged substantially perpendicular with respect to the inner surface 11 of the first skin element 10. Analogously, the second coupling element 23 protrudes away from the inner surface 21, for example such that the second coupling element 23 is arranged substantially perpendicular with respect to the inner surface 21 of the second skin element 20.

The first coupling element 13 and the second coupling element 23 are coupled to each other in a coupling region 30 that is arranged between the inner surface 11 of the first skin element 10 and the inner surface 21 of the second skin element 20.

The first skin element 10 and the first coupling element 13 are formed as a (first) single-piece structure. In particular, the first skin element 10 and the first coupling element 13 may be manufactured of the same material. Furthermore, the second skin element 20 and the second coupling element 23 may be formed as a (second) single-piece structure. In particular, the second skin element 20 and the second coupling element 23 may be manufactured of the same material. One or both of the two single-piece structures may comprise a metallic material or a fiber-reinforced material, like carbon fiber reinforced plastics.

In the coupling region 30, the first coupling element 13 and the second coupling element 23 overlap each other, thereby forming an overlapping region. In the coupling region 30, in particular in the overlapping region, the first coupling element 13 and the second coupling element 23 are connected, e.g., bonded or welded, to each other via a bonding connection, which bonding connection may be a metal bonding connection, a thermoset bonding connection or a thermoplastic bonding connection. For example, if the coupling elements 13, 23 are made of a metallic material, the bonding connection may be a metal bonding, whereas, if the coupling elements 12, 23 are made of a thermoset material, the bonding connection may be a thermoset bonding connection. The connections are preferably provided using a welding technique, for example laser beam welding.

As can be seen in FIG. 1, the aerodynamic outer surface 12 of the first skin element 10 is an entirely closed surface and the aerodynamic outer surface 22 of the second skin element 20 is an entirely closed surface. In this manner, the outer contour of the leading-edge device 1 is basically provided by only two components, namely the first skin element 10 and the second skin element 20, both being connected to each other.

Both skin elements 10, 20 may be connected to each other at a leading-edge region 4 of the leading-edge device 1, for example via an additional flange element 33, like an L-flange. Both skin elements 10, 20 may also be connected to each other at a trailing-edge region 5 of the leading-edge device 1. In the configuration shown in FIG. 1, the first skin element 10 provides an integrally formed curved structure and the second skin element 20 also provides an integrally formed curved structure. Thus, the leading-edge device 1 may have an airfoil-like shape.

The leading-edge device 1 may have a chordwise direction 2 and a spanwise direction 3, wherein the spanwise direction 3 is substantially perpendicular to the chordwise direction 2. In FIG. 1, the spanwise direction points into the drawing sheet. The first coupling element 13 is a longitudinal stiffening element extending on the inner surface 11 of the first skin element 10 in the spanwise direction 3. Therefore, the first coupling element 13 is configured to stiffen at least a part of the first skin element 10 in the spanwise direction 3. Similarly, the second coupling element 23 is a longitudinal stiffening element extending on the inner surface 21 of the second skin element 20 in the spanwise direction 3. Therefore, the second coupling element 23 is configured to stiffen at least a part of the second skin element 20.

Figure 2:
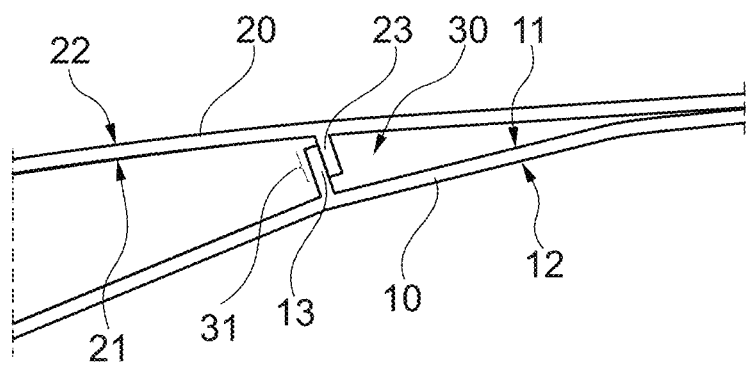
FIG. 2 illustrates a detailed view of a coupling region within the leading-edge device of FIG. 1.

FIG. 2 shows a detailed view of the coupling region 30 of the leading-edge device 1 of FIG. 1. As can be seen, the first coupling element 13 is integrally formed with the first skin element 10 such that both elements together form a single-piece structure. In the same way, the second coupling element 23 is integrally formed with the second skin element 20 such that both elements together form another single-piece structure. The first coupling element 13 overlaps with the second coupling element 23, at least along a portion of the first and second coupling elements 13, 23. In this overlapping region 31, the first coupling element 13 is bonded to the second coupling element 23. The corresponding bonding connection may be a material bond where the material of both coupling elements 13, 23 has been heated, activated, melted and/or merged during the manufacturing of the coupling. Such a boding connection avoids the usage of additional fasteners, thereby reducing the complexity and thus the installation effort during the manufacturing. With respect to the remaining components shown in FIG. 2, reference is made to FIG. 1.

Figure 3:
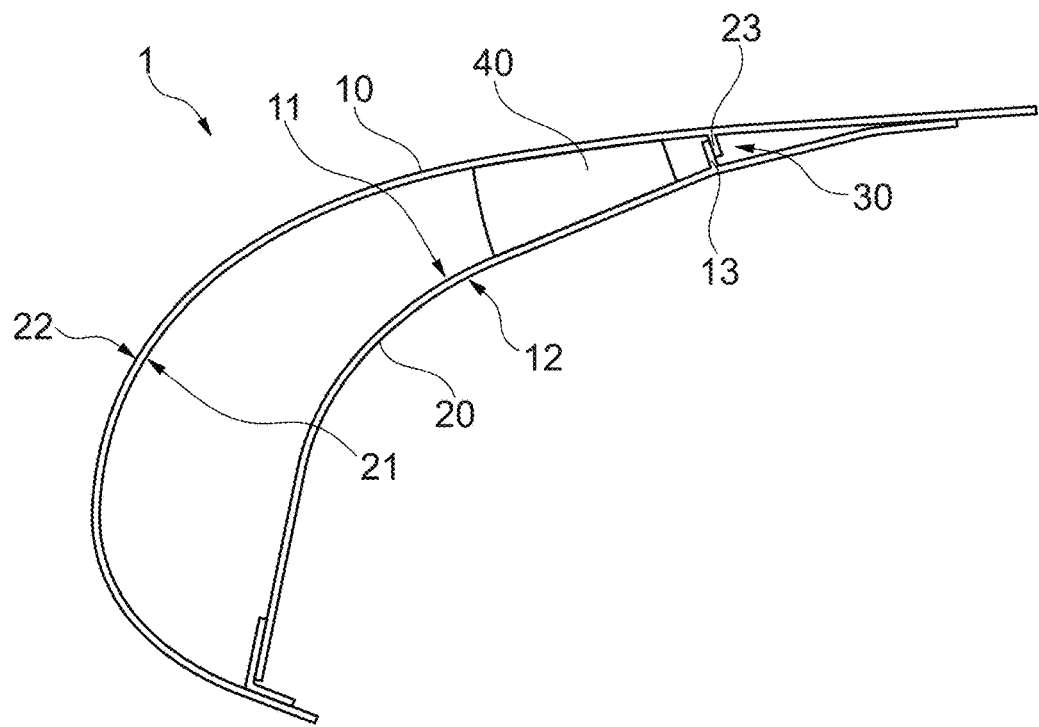
FIG. 3 illustrates a modified example of the leading-edge device of FIG. 1.

FIG. 3 shows another example of the leading-edge device 1 of FIG. 1. An additional rib or spar element 40 is shown which provides an additional stiffening in the chordwise direction 2 (cf. FIG. 1). With respect to the remaining components shown in FIG. 3, reference is made to FIG. 1.

Figure 4:
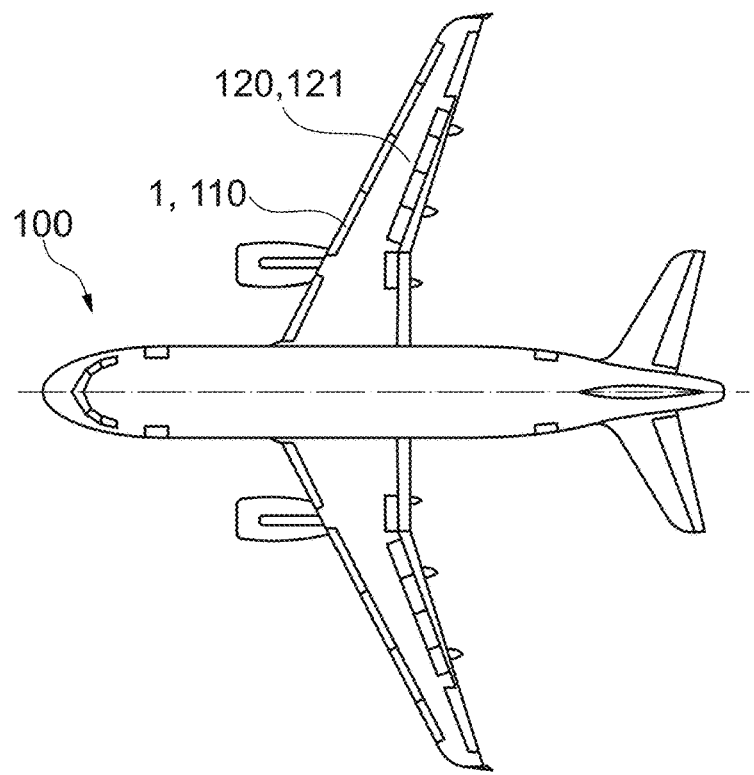
FIG. 4 illustrates an aircraft comprising the leading-edge device of FIG. 1.

FIG. 4 shows an aircraft 100 comprising the leading-edge device 1 of FIG. 1. The leading-edge device 1 is used as a leading-edge slat 110 of an aircraft wing 121 of the aircraft 100. The leading-edge device 1 may be coupled to the aircraft wing 121 by a drive mechanism (not shown), which drive mechanism is configured to extend or retract the leading-edge device 1 with respect to the aircraft wing 121.

Figure 5:
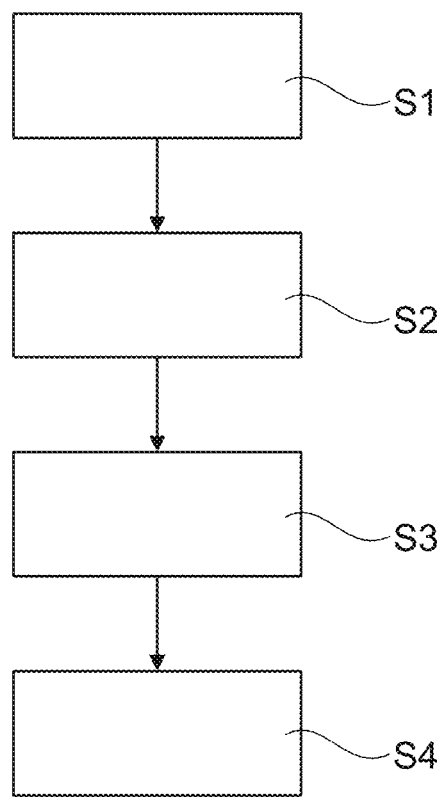
FIG. 5 illustrates a flow diagram of a method for manufacturing a leading-edge device.

FIG. 5 shows a flow diagram of a method for manufacturing a leading-edge device, for example the leading-edge device of FIG. 1 described above. In a step S1 of the method, a first skin element 10 with a first coupling element 13 protruding from an inner surface 11 of the first skin element 10 is provided, wherein the first skin element 10 and the first coupling element 13 are formed as a single-piece structure. In another step S2 of the method, a second skin element 20 with a second coupling element 23 protruding from an inner surface 21 of the second skin element 20 is provided. In another step S3 of the method, the first coupling element 13 is arranged relative to the second coupling element 23 such that the first coupling element 13 and the second coupling element 23 overlap each other in a coupling region 30 that is arranged between the first skin element 10 and the second skin element 20. In another step S4 of the method, the first coupling element 13 is bonded to the second coupling element 23 in the coupling region 30.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A leading-edge device for an aerodynamic component, comprising:
    a first skin element having an inner surface and an aerodynamic outer surface;
    a second skin element having an inner surface and an aerodynamic outer surface;
    a first coupling element protruding from the inner surface of the first skin element;
    a second coupling element protruding from the inner surface of the second skin element;
    wherein the first coupling element and the second coupling element are coupled to each other in a coupling region that is arranged between the inner surface of the first skin element and the inner surface of the second skin element;
    wherein the first skin element and the first coupling element are formed as a single-piece structure; and,
    wherein, in the coupling region, the first coupling element and the second coupling element overlap each other, thereby forming an overlapping region that is substantially perpendicular to the first and the second skin elements.

2. The leading-edge device according claim 1, wherein the second skin element and the second coupling element are formed as a single-piece structure.

3. The leading-edge device according claim 1, wherein, in the coupling region, the first coupling element and the second coupling element are bonded to each other via a bonding connection.

4. The leading-edge device according claim 3, wherein the bonding connection is at least one of a metal bonding connection, a thermoset bonding connection or a thermoplastic bonding connection.

5. The leading-edge device according claim 1, wherein, in the coupling region, the first coupling element and the second coupling element are attached to each other using at least one of an adhesive connection, a weld connection, a screw connection or a rivet connection.

6. The leading-edge device according claim 1, wherein the aerodynamic outer surface of the first skin element is an entirely closed surface; and/or wherein the aerodynamic outer surface of the second skin element is an entirely closed surface.

7. The leading-edge device according claim 1, wherein the first skin element is an integrally formed curved structure; and/or wherein the second skin element is an integrally formed curved structure.

8. The leading-edge device according claim 1, wherein the single-piece structure formed by the first skin element and the first coupling element includes at least one of a reinforced thermoplastic material, a thermoset material or a metallic material.

9. The leading-edge device according claim 1, wherein the second skin element and/or the second coupling element includes at least one of a reinforced thermoplastic material, a thermoset material or a metallic material.

10. The leading-edge device according claim 1, wherein the first coupling element is a longitudinal stiffening element extending on the inner surface of the first skin element and configured to stiffen at least a part of the first skin element; and/or wherein the second coupling element is a longitudinal stiffening element extending on the inner surface of the second skin element and configured to stiffen at least a part of the second skin element.

11. The leading-edge device according claim 1, wherein the first skin element and the second skin element define an aerodynamic profile having a chordwise direction and a spanwise direction which is substantially perpendicular to the chordwise direction;

wherein each of the first coupling element and the second coupling element extends in the spanwise direction.

12. An aircraft comprising the leading-edge device according to claim 1.

13. A method for manufacturing a leading-edge device for an aerodynamic component, comprising:

providing a first skin element with a first coupling element protruding from an inner surface of the first skin element, wherein the first skin element and the first coupling element are formed as a single-piece structure;

providing a second skin element with a second coupling element protruding from an inner surface of the second skin element;

arranging the first coupling element relative to the second coupling element such that the first coupling element and the second coupling element overlap each other in a coupling region that is arranged between the first skin element and the second skin element;

bonding the first coupling element to the second coupling element in the coupling region;

wherein, in the coupling region, the first coupling element and the second coupling element overlap each other, thereby forming an overlapping region that is substantially perpendicular to the first and the second skin elements.

14. A leading-edge device for an aerodynamic component, comprising:

a first skin element having an inner surface and an aerodynamic outer surface;

a second skin element having an inner surface and an aerodynamic outer surface;

a first coupling element protruding from the inner surface of the first skin element;

a second coupling element protruding from the inner surface of the second skin element;

wherein the first coupling element and the second coupling element are coupled to each other in a coupling region that is arranged between the inner surface of the first skin element and the inner surface of the second skin element;

wherein the first skin element and the first coupling element are formed as a single-piece structure;

wherein the first coupling element is arranged substantially perpendicular with respect to the inner surface of the first skin element; and, wherein the second coupling element is arranged substantially perpendicular with respect to the inner surface of the second skin element.

\* \* \* \* \*